United States Patent Office
3,437,586
Patented Apr. 8, 1969

3,437,586
PETROLEUM PROCESS CATALYST SUPPORTED
ON A MOLECULAR SIEVE ZEOLITE
Paul B. Weisz, Media, Pa., assignor to Mobil Oil
Corporation, a corporation of New York
No Drawing. Continuation-in-part of application Ser. No.
754,915, Aug. 14, 1958. This application Feb. 12, 1962,
Ser. No. 172,757
Int. Cl. C10g 11/04
U.S. Cl. 208—110
5 Claims

ABSTRACT OF THE DISCLOSURE

A catalyst is provided for upgrading of hydrocarbons in such processes as hydroforming, hydrogenation, dehydrogenation, hydrocracking, aromatization, hydrodealkylation. The catalyst is characterized by a crystalline aluminosilicate component and by the presence of metals or compounds of metals of the platinum group, molybdenum, chromium, tungsten, vanadium, nickel, copper or cobalt or mixtures of the same.

This application is a continuation-in-part of application Ser. No. 754,915, now Patent No. 3,001,220, filed Aug. 14, 1958.

This invention relates to the preparation of catalyst and more particularly to the preparation of catalysts suitable for upgrading hydrocarbons. Still more particularly, the present invention relates to the preparation of supported platinum and palladium catalysts having a wide variety of applications in upgrading hydrocarbons, such as hydroforming, hydrogenation, dehydrogenation, hydrocracking, aromatization, hydrodealkylation and the like.

The use of platinum group catalysts for the foregoing processes has long been known. Thus, hydroforming utilizing certain platinum catalyst supported on alumina has previously been described. Other suggested supports have included silica gel, active char and alumina. These materials have the disadvantage of possessing non-uniform pores and of presenting certain problems with respect to regeneration of the catalyst after the same has been used for converting hydrocarbons with accompanying deposition of coke on the catalyst.

It is an object of the present invention to provide a process for upgrading hydrocarbons employing a hydrocarbon conversion catalyst supported on a highly selective adsorbent base.

It is a still further object of the present invention to provide a process for upgrading hydrocarbons employing a platinum group metal supported on a crystalline alumino-silicate support having pore openings of uniform size large enough to permit entrance of the reacting molecules.

The above and other objects which will be apparent to those skilled in the art are realized in accordance with the present invention.

It has now been found that platinum catalysts, suitable for upgrading hydrocarbons, may be prepared by employing as a support crystalline alumino-silicates having pore openings adequate to admit freely not only the interacting molecules but also the reaction product formed. The pore opening will therefore be about 6 to 15 Angstroms. The particular advantage of the above alumino-silicate catalyst bases is derived from the uniformity of the pore openings which allows free ingress an degress of the reactants and reaction products respectively.

Crystalline alumino-silicates of highly uniform pore size which behave as molecular sieves have heretofore been utilized for effecting physical separation of mixtures of materials of varying molecular size. Such substances have been described in the literature and particularly in U.S. Patent No. 2,882,243, and U.S. Patent No. 2,882,244. Thus, molecular sieves are essentially the dehydrated forms of crystalline natural or synthetic hydrous siliceous zeolites containing varying quantities of sodium, calcium, and aluminum with or without other metals. All or a portion of the sodium or calcium ions normally contained in the molecular sieve structure may be zeolitically replaced with a number of other ions. The atoms of sodium, calcium, or metals in replacement thereof, silicon, aluminum and oxygen in these zeolites are arranged in the form of an alumino-silicate salt in a definite and consistent crystalline pattern. This structure contains a large number of small cavities, interconnected by a number of still smaller holes or channels. These cavities and channels are precisely uniform in size. Chemically, these zeolites may be represented by the general formula:

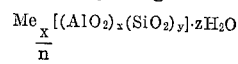

where Me is the total hydrogen and metal cation content of the alumino-silicate, $x/n$ is the number of exchangeable cations of valence $n$, $x$ is also the number of aluminum ions combined in the form of aluminate, $y$ is the number of silicon atoms and $z$ is the number of water molecules, removal of which produces the characteristic channel system. In the above formula the ratio of $y/x$ is a number generally from 1 to 5. At the present time, there are commercially available molecular sieves of the "A" series and of the "X" series. The "A" series molecular sieves have channels in the approximate range of 3 to 5 Angstroms, depending on the nature of the cation present. The "X" series molecular sieves have channels of larger size. Thus, a crystalline sodium alumino-silicate which has pores or channels of approximately 13 Angstrom units in diameter is known commercially as "Molecular Sieve 13X." The letter "X" is used to distinguish the interatomic structure of this zeolite from that of the "A" crystal mentioned above. As prepared, the 13X material contains water and has the unit cell formula

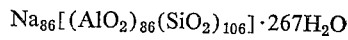

The parent zeolite is dehydrated for catalytic purposes. The 13X crystal is structurally identical with faujasite, a naturally-occurring zeolite. Faujasite, however, is not identical in composition with the 13X zeolite. The synthetic zeolite known as "Molecular Sieve 10X" is a crystalline alumino-silicate salt having channels about 10 Angstroms in diameter and in which a substantial proportion of the sodium ions of the 13X material have been replaced by calcium.

Molecular sieves of the "X" series are ordinarily prepared initially in the sodium form of the crystal. The sodium ions in such form may, as desired, be exchanged for other cations. In general, the process of preparation involves heating, in aqueous solution, an appropriate mixture of oxides, or of materials whose chemical composition can be completely represented as a mixture of oxides $Na_2O$, $Al_2O_3$, $SiO_2$ and $H_2O$ at a temperature of 100° C. for periods of 15 minutes to 90 hours or more. The product, which crystallizes within this hot mixture is separated therefrom and water washed until the water, in equilibrium with the zeolite, has a pH in the range of 9 to 12. After activating by heating until dehydration is attained, the substance is ready for use.

The empirical formula for the zeolites utilized herein can be expressed as:

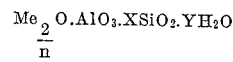

where Me represents the total hydrogen and metal cation content of the alumino-silicate and $n$ is the valence of the particular cation represented. A specific crystalline zeolite has values of X and Y within a definite range. The value of X for any specific zeolite varies in a certain manner depending on whether aluminum or silicon atoms occupy equivalent positions in the lattice. For molecular sieves of the "X" series, X has an average value of 2.5±0.5. The value of Y, depending on the condition of hydration and on the metal cation present may vary from 8 to 0. The average value of Y for the completely hydrated sodium zeolite of the "X" series is 6.2. Particularly preferred for use as molecular sieves herein are those having the empirical formula:

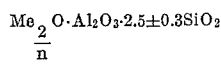

where Me represents the total hydrogen and metal cation content of the alumino-silicate and $n$ is the valence of the particular cation represented.

Suitable reagents in the preparation of the sodium zeolite of the "X" series include silica gel, silicic acid, or sodium silicate as sources of silica. Alumina can be supplied by utilizing activated alumina, gamma alumina, alpha alumina, aluminum trihydrate or sodium aluminate. Sodium hydroxide is suitably used as the source of the sodium ion and in addition contributes to the regulation of the pH. All reagents are preferably soluble in water. The reaction solution has a composition, expressed as mixtures of oxides, within the following ranges: $SiO_2/Al_2O_3$ of 3 to 5; $Na_2O/SiO_2$ of 1.2 to 1.5; and $H_2O/Na_2O$ of 35 to 60. The reaction mixture is placed in a suitable vessel which is closed to the atmosphere in order to avoid losses of water and the reagents are then heated for an appropriate length of time. A convenient and generally employed process of preparation involves preparing an aqueous solution of sodium aluminate and sodium hydroxide and then adding with stirring an aqueous solution of sodium silicate. While satisfactory crystallization may be obtained at temperatures from 21° C. to 150° C., the pressure being atmospheric or less, corresponding to the equilibrium of the vapor pressure with the mixture at the reaction temperature, crystallization is ordinarily carried out at about 100° C. For temperatures between room temperature (21° C.) and 150° C. an increase in temperature increases the velocity of the reaction and thus decreases its duration. As soon as the zeolite crystals are completely formed, they retain their structure and it is not essential to maintain the temperature of the reaction any longer in order to obtain a maximum yield of crystals.

After formation, the crystalline zeolite is separated from the mother liquor, usually by filtration. The crystalline mass is then washed, preferably with distilled water and while on the filter, until the wash water, in equilibrium with the zeolite, reaches a pH of 9 to 12. The crystals are then dried at a temperature between 25° C. and 150° C. Activation is attained upon dehydration.

The sodium ions of the above zeolite may be replaced partially or completely by other cations. These replacing ions include other monovalent or divalent cations such as lithium and magnesium, metal ions of the first group of the Periodic Table such as potassium and silver, metal ions of the second group such as calcium and strontium, metal ions such as nickel, cobalt, iron, zinc, mercury, cadmium, gold, scandium, titanium, vanadium, chromium, manganese, tungsten, yttrium, zirconium, niobium, molybdenum, hafnium, tantalum, cerium and other rare earth metals, as well as other ions such as ammonium which react as metal in that they replace sodium ions without occasioning any appreciable change in the fundamental structure of the crystalline zeolite. Replacement is suitably accomplished by contacting the crystalline sodium alumino-silicate zeolite with a solution of an ionizable compound of the ion which is to be zeolitically introduced into the molecular sieve structure for a sufficient time to bring about the extent of desired introduction of such ion. After such treatment, the resulting exchanged product is water-washed and dried and thereafter is ready for use. The extent to which exchange takes place can be controlled. Thus, taking the exchange of sodium for calcium as a typical example, such exchange can be effected in a proportion of less than 5% up to 100%. One method of regulation of the degree of exchange consists of impregnating a known amount of the sodium zeolite with solutions containing determined amounts of exchangeable ions. For use as a support in the catalytic processes described herein, the molecular sieve should contain no more than 10 percent sodium, calculated as $Na_2O$. Thus, a suitable support is the 10X zeolite wherein the major cation is calcium and the sodium content is approximately 1.2 weight percent, expressed as $Na_2O$. In general, depending upon the extent of replacement of the sodium ion, the catalyst base has the composition 1.0 to 10.0 percent $Na_2O$, 30.0 to 40.0 percent $Al_2O_3$ and 45.0 to 55.0 percent $SiO_2$.

The above alumino-silicates not only serve as a support for the component characterized by catalytic hydrogenation activity but also possess catalytic activity in their own right. The hydrogenation component is a solid element or compound known to have the property of catalyzing hydrogenation-dehydrogenation reactions. As is well known, materials catalyzing hydrogenation will catalyze dehydrogenation and likewise those catalyzing dehydrogenation will catalyze hydrogenation. The term hydrogenation component, as utilized herein, will accordingly be understood to include those elements and compounds which effectively catalyze both hydrogenation and dehydrogenation. The term applies particularly to the transition elements and their compounds, especially oxides and sulfides, as is well known in the art. Typical of the hydrogenation components are the platinum group metals, and metal oxides such as $MoO_3$, $Cr_2O_3$, $WO_3$, $V_2O_5$, $CoMoO_4$, NiO, CuO and mixtures thereof as well as sulfides of the foregoing metals and mixtures thereof.

Impregnation of the crystalline alumino-silicate with hydrogenation component may be carried out by conventional means. Thus, taking the platinum group metals as illustrative, these metals are applied in solution and accordingly soluble compounds such as chloroplatinic acid, ammonium chloroplatinate, platinic amine chloride, palladium chloride, etc. are used. The amount of catalytic metal in the finished catalyst is ordinarily between 0.01 and about 5.0 weight percent. In the case of platinum, the amount is preferably between 0.01 and 2.0 percent, and in the case of palladium, the amount is preferably between 0.01 and 5.0 weight percent.

The platinum group metals, i.e., metals of the platinum series contained in the present catalyst composition include those having atomic numbers 44 to 46 and 76 to 78 inclusive, namely platinum, palladium, ruthenium, osmium, iridium and rhodium. Of this group, platinum and palladium are accorded preference. Each of the platinum metals may occur in a variety of compounds. Thus, suitable platinum compounds include chloroplatinic acid, platinous chloride and various compounds containing the platinum ammine complex. The use of chloroplatinic acid serves to introduce hydrogen ions into the structure of the alumino-silicate, affording a resulting product of platinum hydrogen alumino-silicate or platinum acid alumino-silicate.

The impregnating solution may be contacted with the crystalline zeolite of uniform pore structure in the form of either a fine powder, a compressed pellet or an extruded pellet. When in the form of a pellet, the crystalline zeolite may be combined with a suitable binder such as clay. The volume of impregnating solution may be just sufficient to be adsorbed by the crystalline zeolite. Generally, however, an excess of solution is employed and such excess is removed from contact with the crystalline zeolite after a suitable period of contact and prior to drying of the zeolite. The time of contact between the impregnating solution and crystalline zeolite is such as to effect deposition on the crystalline structure of the hydrogenating component derived from such solution. It will be appreciated that such period of contact may vary widely depending on the temperature of the solution, the nature of crystalline zeolite used, the particular compound utilized for impregnating and the concentration of hydrogenating component desired in the final catalyst. Thus, the time of contact may extend from a very brief period of the order of minutes for small particles to long periods of the order of days for large pellets. The temperature of the solution will ordinarily be room temperature but may be an elevated temperature below the boiling point of the solution.

After the contact period the crystalline zeolite is removed from the impregnating solution. Excess solution, if employed, is removed by washing with water. The resulting material is then dried, generally in air, to remove substantially all of the water therefrom. The dried material is thereafter calcined and may, if desired, be subjected to a sulfiding treatment.

The catalyst prepared in accordance with the present invention is especially suitable for upgrading hydrocarbons to products of increased value. The conditions under which catalytic conversion is effected in any instance are contemplated to be those conventionally employed for the particular reaction involved. Thus, depending on the particular nature and extent of upgrading, the temperature may extend from ambient temperature up to 1000° F. or more, the pressure may range from atmospheric to 6000 pounds per square inch gauge or more. Hydroforming may be carried out with the present catalyst, for example, at temperatures from about 600° to about 1000° F.; preferably 800° to 950° F., at pressures of from atmospheric to 1000 pounds per square inch, preferably at 50 to 250 p.s.i.g., at naphtha feed rates of about 0.25 to 4 vols. liquid feed/vol. cat./hour, preferably 1 to 2 v./v./hr. in a fixed bed unit and hydrogen-containing recycle gas is recycled at a rate of about 2,000–12,000, preferably about 6000 cubic feet per barrel of feed.

The following examples will serve to illustrate the invention without limiting the same.

EXAMPLE 1

This example shows the use of a zeolitic structure having approximately 10 Angstrom channel dimensions into which hydrogenation activity has been introduced. This material is a synthetic faujasite of the "X" crystal variety. As can best be seen from inspection of molecular models, the dimension of 10 Angstrom units approaches the molecular size of polysubstituted aromatic ring compounds. Following the teachings of this invention, a zeolite structure containing hydrogenation activity, as was created by the introduction of the element platinum into the crystal chambers can be used to hydrogenate organic compounds having a molecular size capable of passing a channel dimension of about 10 Angstroms.

A platinum-containing catalyst was prepared by utilizing a crystalline calcium alumino-silicate having channels of about 10 Angstroms in diameter, i.e., molecular sieve 10X, platinic ammine chloride and calcium chloride.

One hundred grams of molecular sieve 10X in the form of pellets containing 20 percent clay as a bonding agent were contacted with 2040 milliliters of a solution containing calcium chloride and platinum as platinic ammine chloride. Such solution was made by mixing 2000 milliliters of a 5.69 molar calcium chloride solution with 40 milliliters of a platinic ammine chloride solution.

The latter solution was prepared by contacting fifty milliliters of chloroplatinic acid solution containing 2.0 grams of platinum with 1240 milliliters of ammonium hydroxide solution containing 28 percent by weight $NH_3$. The mixture was heated until the volume was 110 milliliters. The pH of such solution was 6.0 and was slightly cloudy due to a reaction product of chloroplatinic acid and ammonium hydroxide. The solution was filtered and the resulting colorless filtrate was found to contain 1.66 weight percent of platinum. Platinum in such solution was in the form of platinic ammine chloride.

After approximately 13 days contact between the molecular sieve pellets and above treating solution, excess solution was drained from the solid and the latter was washed with water until free of chloride ion. The solid was dried and calcined in air for 6 hours at a gradually increasing temperature to 800° F. The solid was then flushed with nitrogen, treated for 2 hours at 800° F. in an atmosphere of hydrogen and finally flushed with nitrogen. The finished catalyst contained 0.24 weight percent of platinum and had a sodium content, calculated as $Na_2O$, of <5.9 weight percent.

The product was employed as a catalyst in liquid phase hydrogenation of benzene. For such purpose, 5 grams of the catalyst was mixed with 8.5 grams of benzene in a shaker-bomb at a temperature of 145° F. and a hydrogen pressure of 30 pounds per square inch gauge. The moles of liquid benzene $\times 10^{-3}$ converted per hour per gram of catalyst was found to be 4.0.

EXAMPLE 2

A platinum-containing catalyst was prepared by utilizing a crystalline calcium alumino-silicate having channels of about 10 Angstroms in diameter, i.e., molecular sieve 10X and chloroplatinic acid.

Twenty-five milliliters of a solution of chloroplatinic acid containing 0.0625 gram of platinum was mixed with 17.4 grams of molecular sieve 10X in the form of clay bonded pellets (containing about 20 percent by weight clay) and permitted to stand for one day. The excess solution was then drained from the pellets which were thereafter heated for 1 hour in air at 230° F. and activated by heating for 2 hours at 800° F. The product contained 0.14 weight percent platinum and <5.9 weight percent sodium expressed as $Na_2O$.

The product pellets were powdered to particles which passed through a 100 mesh (Tyler) screen and employed as a catalyst in the hydrogenation of benzene. For such reaction, 2.81 grams of catalyst powder were mixed with 50 milliliters of benzene. The reaction took place in a closed vessel which was shaken mechanically. Hydrogen was added to the system until the total pressure was about 30 pounds per square inch gauge. The reaction temperature was 145° F. Under such conditions, benzene was converted to cyclohexane. The rate of conversion was determined by measuring the rate of pressure drop due to hydrogen consumption. It was found that $1.26 \times 10^{-3}$ moles of liquid benzene were converted per hour per gram of catalyst.

EXAMPLE 3

A catalyst containing platinum deposited on a crystalline calcium alumino-silicate having channels of about 10 Angstroms in diameter, i.e. molecular sieve 10X, was prepared.

The impregnating solution employed resulted from mixing 582 ml. of chloroplatinic acid solution with 2910 ml. of calcium chloride solution (1.39 M $CaCl_2$). The chloroplatinic acid solution was obtained by dissolving 30 grams of $H_2PtCl_6$ in 300 ml. of water and adding 7200 ml. of 28 percent aqueous solution of $NH_4OH$.

One hundred sixteen (116) grams of molecular sieve 10X was soaked for 96 hours in the above impregnating solution. Thereafter, the solid was removed from the solution, washed free of chloride ion, dried and calcined at 800° F. for 3 hours in air, one hour in nitrogen and finally 2 hours in hydrogen. The finished catalyst contained 1.3 weight percent sodium expressed as $Na_2O$.

The above catalyst was employed for hydrocracking a hydrocarbon stream of n-octane mixed with hydrogen in an amount corresponding to a molar ratio of hydrogen to octane of 33.5. The charge was passed at a flow rate of 60 cc./minute over 0.3 gram of the catalyst and also over 10X zeolite alone for comparison. The results are summarized in Table I below:

TABLE I

| Catalyst | Time on stream, min. | Temp., °F. | Conversion, percent |
|---|---|---|---|
| Pt/10X | 45 | 650 | 3.9 |
|  | 80 | 750 | 15.4 |
|  | 184 | 800 | 23.9 |
|  | 220 | 850 | 45.8 |
| 10X | 10 | 750 | .5 |
|  | 46 | 800 | .4 |
|  | 116 | 900 | .6 |

It will be evident from the foregoing that while 10X afforded only slight hydrocracking, platinum deposited on 10X was a highly effective hydrocracking catalyst.

The catalyst of this example was further used in hydrocracking n-tetradecylnaphthalene at pressures from 2000 to 6000 p.s.i.g., employing a liquid hourly space velocity of 0.5 and a hydrogen to hydrocarbon mol ratio of 40. The conversions obtained to liquid fractions boiling below 755° F. are summarized in Table II below:

TABLE II

| Cat. temp.,° F | 653 | 450 | 657 | 454 | 658 |
|---|---|---|---|---|---|
| Pressure, p.s.i.g | 2,000 | 4,000 | 4,000 | 6,000 | 6,000 |
| Product distribution: |  |  |  |  |  |
| Wt. percent gas | 0 | 0 | 0 | 0 | 0 |
| 110–490° F | 4.2 | 7.2 | 6.8 | 14.4 | 5.9 |
| 490–680° F | 1.8 | 1.6 | 3.0 | 2.2 | 1.2 |
| 680–755° F | 64.3 | 8.1 | 70.6 | 12.8 | 75.6 |
| 755° F.+ | 29.7 | 83.1 | 19.6 | 70.6 | 17.3 |

Hydrocracking with good selectivity was indicated by the absence of any light gases throughout the range of the tests. Hydrocracking of n-tetradecylnaphthalene indicates the quality of a catalyst for hydrogenative ring opening to products useful as lubricant components boiling predominately in the 680–755° F. boiling range. The presence of products boiling in the 110–490° F. boiling range is attributable to hydrodealkylation since the $C_{10}$ side chains, when dealkylated, lead specifically to decanes with boiling points between 320° and 345° F.

EXAMPLE 4

Hydrogenation of butene-1 was effectively carried out in the presence of a catalyst containing platinum deposited on a crystalline calcium alumino-silicate having channels approximating 10 Angstroms in diameter.

The catalyst was prepared by dissolving 20 grams of hydrated chloroplatinic acid (40% Pt) in 200 ml. of water. To this solution 4800 ml. concentrated $NH_4OH$ was added. After standing 16 hours, the solution was boiled down to 400 ml. The solution was then mixed with 10 liters of 1.5 molar calcium chloride.

Four hundred grams of a crystalline calcium aluminosilicate containing approximately 1.2 weight percent sodium, expressed as $Na_2O$, and having channels of about 10 Angstrom units in diameter, i.e. molecular sieve 10X, was added to the solution and allowed to stand for several days. The solid was then filtered off and washed until free of chloride ion. The solid was then dried in air at a maximum temperature of 230° F. and thereafter heated for one hour at 500° F. in nitrogen.

The resulting composite was evaluated for hydrogenation activity by placing 0.2 gram in a Pyrex tube, passing over the powder 25 ml./min. of butene-1 mixed with an equal volume of hydrogen at ambient temperature and analyzing the resulting products in a vapor fractometer. Upon so doing, the hydrocarbon product stream was found to contain 68 mol percent of n-butane, indicating that butene-1 may be readily hydrogenated at ambient temperature in the presence of the described catalyst.

It is to be understood that the above description is merely illustrative of preferred embodiments of this invention of which many variations may be made by those skilled in the art without departing from the spirit thereof.

I claim:
1. A process for hydrocracking which comprises contacting a hydrocarbonaceous fluid at elevated temperatures with a hydrocarbon conversion catalyst selected from the class consisting of metals and compounds of the platinum group, oxides and sulfides of molybdenum, chromium, tungsten, vanadium, nickel, copper, cobalt, cobalt molybdate and mixtures thereof, in intimate contact with a zeolitic crystalline molecular sieve aluminosilicate base having uniform pore openings between about 6 and about 15 Angstrom units, said molecular sieve being further characterized in that it contains no more than 10% sodium, calculated as $Na_2O$.

2. The process of claim 4 wherein said base contains between 0.01 and 5.0% by weight of said platinum group metal.

3. The process of claim 4 wherein said metal is platinum.

4. An improved hydrocracking process which comprises contacting a hydrocarbon charge at an elevated temperature with a platinum group metal-containing crystalline alumino-silicate having a uniform pore diameter between 6 and 15 Angstrom units, said molecular sieve being further characterized in that it contains no more than 10% sodium calculated as $Na_2O$.

5. The process of claim 4 wherein platinum metal is introduced into contact with the crystalline aluminosilicate from a platinum metal amine solution.

References Cited

UNITED STATES PATENTS 2,971,904   2/1961   Gladrow et al. _____ 208—135

DELBERT E. GANTZ, *Primary Examiner.*

T. H. YOUNG, *Assistant Examiner.*

U.S. DEPARTMENT OF COMMERCE
PATENT OFFICE
Washington, D.C. 20231

UNITED STATES PATENT OFFICE
CERTIFICATE OF CORRECTION

Patent No. 3,437,586                              April 8, 1969

Paul B. Weisz

It is certified that error appears in the above identified patent and that said Letters Patent are hereby corrected as shown below:

Column 1, line 26, "3,001,220" should read -- 3,140,322 -

Signed and sealed this 7th day of April 1970.

(SEAL)
Attest:

Edward M. Fletcher, Jr.                  WILLIAM E. SCHUYLER, JR

Attesting Officer                          Commissioner of Patents